US007168934B2

(12) United States Patent
Jung

(10) Patent No.: US 7,168,934 B2
(45) Date of Patent: Jan. 30, 2007

(54) INSTALLATION FOR PRODUCING CABLES

(75) Inventor: Joachim Jung, Hannover (DE)

(73) Assignee: Troester GmbH & Co. KG, Hannover (DE)

( * ) Notice: Subject to any disclaimer, the term of this patent is extended or adjusted under 35 U.S.C. 154(b) by 283 days.

(21) Appl. No.: 10/796,389

(22) Filed: Mar. 9, 2004

(65) Prior Publication Data

US 2004/0234640 A1 Nov. 25, 2004

(30) Foreign Application Priority Data

Mar. 17, 2003 (DE) ................................ 103 11 512

(51) Int. Cl.
*B29C 47/28* (2006.01)

(52) U.S. Cl. ............... 425/114; 425/133.1; 425/192 R; 425/144; 425/378.1

(58) Field of Classification Search ............. 425/133.1, 425/144, 378.1, 192 R, 131.1, 113, 114
See application file for complete search history.

(56) References Cited

U.S. PATENT DOCUMENTS

| | | | | |
|---|---|---|---|---|
| 3,571,851 | A * | 3/1971 | Ackley et al. | 425/108 |
| 4,029,450 | A * | 6/1977 | Caser | 425/71 |
| 4,609,509 | A * | 9/1986 | Sarracino | 264/37.24 |
| 4,955,803 | A * | 9/1990 | Miller et al. | 425/145 |
| 5,096,646 | A * | 3/1992 | Shigemoto et al. | 264/166 |
| 5,239,813 | A | 8/1993 | Baumgarten | |
| 5,658,598 | A * | 8/1997 | Veijanen | 425/113 |
| 5,976,449 | A * | 11/1999 | Salzmann et al. | 264/408 |

FOREIGN PATENT DOCUMENTS

| | | |
|---|---|---|
| DE | 40 03 735 | 8/1991 |
| DE | 101 04 994 | 8/2002 |
| DE | 102 02 946 | 7/2003 |

* cited by examiner

*Primary Examiner*—Joseph S. Del Sole
(74) *Attorney, Agent, or Firm*—Jordan and Hamburg LLP

(57) ABSTRACT

A system for producing cables includes an extrusion apparatus with at least one extruder and a head for receiving at least one line of the cable. An induction heating apparatus is disposed downstream of the extrusion apparatus. Downstream of the head and the induction heating apparatus is a suspended vulcanization tube that extends horizontally and forms a catenary curve. The vocalization tube includes a movable and an immobile telescoping tube wherein the mobile tube is adjacent to the head and enables access to the head. The induction heating apparatus downstream of the head is installed in the movable tube or is securely attached to the movable tube, and together with the movable tube is movable. The movable tube and the interiorly installed or exteriorly attached induction heating apparatus is insertable into the immobile tube or is slidable over the immobile tube.

18 Claims, 4 Drawing Sheets

INSTALLATION FOR PRODUCING CABLES

BACKGROUND OF THE INVENTION

The invention relates to a system for producing cables, comprising an extrusion apparatus with one or a plurality of extruders and a cross head through which the line or lines for the cable pass and after which an induction heating apparatus is arranged, whereby downstream of the cross head and the induction heating apparatus downstream thereof, for cross-linking and/or vulcanization of the extruded jacket layer, is a tube that constitutes a plurality of tube pieces, of which the tube piece adjacent to the cross head is a telescoping tube enabling access to the cross head.

The core of the cable comprises one or a plurality of copper wires that are surrounded by insulating and/or semiconductor layers that are fed by the extruder or extruders to the head and in the head are molded into the insulating layers covering the line or lines.

Such a system has become known from various previous uses. In the vulcanization tube downstream of the head, the freshly produced cable leaving the head must be maintained for a certain time at a temperature above the vulcanization temperature of the extruded layers. This occurs from the exterior using radiation and using the hot, primarily gaseous medium situated in the vulcanization tube. The vulcanization tube can be a suspended tube extending in the horizontal direction like a catenary curve; it can also be a vertically positioned tube, if necessary with a 180° reversing site.

With the induction heating, the core of the cable is heated to a temperature above the vulcanization temperature so that the heat required for vulcanization is also carried into the insulating layers from the interior. This heat carried in by induction thus reduces the time required for heating the entire cross-section of the cable to the vulcanization temperature and thus also reduces the structure length of the vulcanization tube. Every possible reduction in the length of the vulcanization tube increases the efficiency of the cable producing system, reduces capital costs, not only for the system but also for the workshop, and simplifies its operation.

SUMMARY OF THE INVENTION

The invention avoids the disadvantages of the prior art. It is the object of the present invention to increase the efficiency of a cable production system using measures that yield a shorter structural length, facilitate more rapid heating of the insulating layers for the purpose of vulcanization or cross-linking and simpler operation of the system, and furthermore simplify access by the machine operator to the head when a tool is being exchanged and during cleaning.

What the invention comprises is that the induction heating apparatus downstream of the cross head is securely installed or attached in or to the movable tube of the telescoping tube and together with this tube is movable, whereby the movable tube of the telescoping tube along with the installed induction heating system is insertable into or can slide over the immobile tube of the telescoping tube.

This arrangement provides the advantage of the possibility for a shorter structure for the vulcanization tube and improved access to the head for cleaning, maintenance, and tool exchange tasks. Because the induction heating of the cable core begins immediately after the head of the extruder. Furthermore, a tube that can slide into the fixed tube obtains the advantage that the head-side bearing of the vulcanization tube can occur at a location at which the movable tube is situated in the fixed tube of the telescoping tube. The bearing location thus moves closer to the head without reducing the space at the head that is required for maintenance.

It is advantageous that the induction heating apparatus occupies the entire length of the movable tube, because this means that the line heating can be performed more uniformly and more effectively.

The induction heating apparatus heats the metal line in the cable so that the cable is warmed and heated not only by heat sources acting exteriorly on the cable, but also interiorly by heating the lines, which then give off their heat outwardly into the cable jacket.

In order to keep the energy losses from the induction heating to a minimum, it is advantageous when the movable tube of the telescoping tube is produced from an electrically non-conducting material, or a material that is as poorly conducting as possible, but a material that is heat-resistant and resistant to compression.

It is practical when the movable tube of the telescoping tube is produced from a carbon fiber compound.

In an inventive system in which the movable tube of the telescoping tube in which or on which the induction heating apparatus is installed, it [the movable tube] should have an exterior diameter that is smaller than the interior diameter of the fixed tube.

In contrast, in a system in which the movable tube of the telescoping tube, upon whose exterior surface the inductive heating arrangement is affixed or in which the inductive heating arrangement is installed, it should have an interior diameter that is greater than the exterior diameter of the fixed tube.

This inventive system can be further optimized in that at least one tube piece at any site on the fixed tube is produced from an electrically non-conducting material, or a material that is as poorly conducting as possible, but a material that is heat resistant, and is surrounded by an induction heating system.

In this case, as well, the induction heating apparatus heats the metal line in the cable so that the cable is warmed and heated not only by heat sources acting exteriorly on the cable, but also interiorly by heating the lines, which then give off their heat outwardly into the cable jacket.

This additional induction heating apparatus can be installed at any site of the long fixed tube where re-heating of the cable core is necessary or advantageous. Thus, it can be also be installed at a site where the extruded cable jacket has already been cooled from the exterior.

Then heat migration is obtained from the cable core situated in the interior of the cable outward. This heat migration can be important for complete cross-linking or vulcanization of the cable jacket, and can also be important for more rapid cross-linking/vulcanization of the cable jacket and thus also for reducing the length of the entire system.

This means that the line that is in the interior of the cable strand and that has lost its heat on its way to this site, while the insulating extrudate surrounding it has increased in strength due to vulcanization/cross-linking, can be re-heated, whereby the re-heating temperature can be higher than the previously introduced temperatures because partial vulcanization/partial cross-linking has already transpired, so that the extrudate at this site is no longer so sensitive to deformations caused by gravity. The re-heating performed here at this site promotes and accelerates vulcanization/cross-linking considerably.

For the method, it can be beneficial when upstream of the cross head is an induction heating apparatus that preferably is set to a temperature that is below the vulcanization temperature, while the induction heating apparatus downstream of the cross head is set for heating at a temperature that is above the vulcanization temperature.

This induction heating system also heats the metal line in the cable so that the cable is warmed and heated not only by heat sources acting exteriorly on the cable, but also interiorly by heating the lines, which then give off their heat outwardly into the extruded cable jacket.

Thus the induction apparatus act prior to and immediately after the head, and these integrated with the displaceable part of the telescoping tube, combine to achieve the technical success of a reduction in the length of the vulcanization tube.

The induction heating apparatus upstream of the head brings heat into the cable core before it even reaches the head and the vulcanization tube. The extruded insulating material jacketing the cable core in the head, which material is at a temperature just below the vulcanization temperature at the time of extrusion, is thus not cooled by a lower temperature of the cable core, but rather remains at its temperature. However, immediately after the head, the second induction heating apparatus that greatly heats the extrudate jacketing the cable core interiorly using the induction heat carried into the cable core, so that uniform vulcanization extending across the cable cross-section occurs very early because the second induction heating apparatus is situated immediately after the head. This position of the second induction heating system is very important for a short structure for the vulcanization tube.

In a system in which the movable tube piece is insertable into the non-displaceable tube piece, the bearing holding the non-displaceable tube piece of the telescoping tube can be arranged at the upper end of the non-displaceable tube piece.

In contrast, in a system in which the movable tube piece can slide onto the non-displaceable tube piece, the non-displaceable tube piece of the telescoping tube is borne at a location that is not covered by the movable tube piece that can slide thereover when it is in its position thereover.

Furthermore, for structural reasons it is advantageous that attached to the movable tube part is a plug that engages contacts affixed on the head when the movable tube part is pushed to the head.

The essence of the invention is explained in greater detail using exemplary embodiments illustrated schematically in the drawings.

DESCRIPTION OF THE PREFERRED EMBODIMENTS

Figure 6:
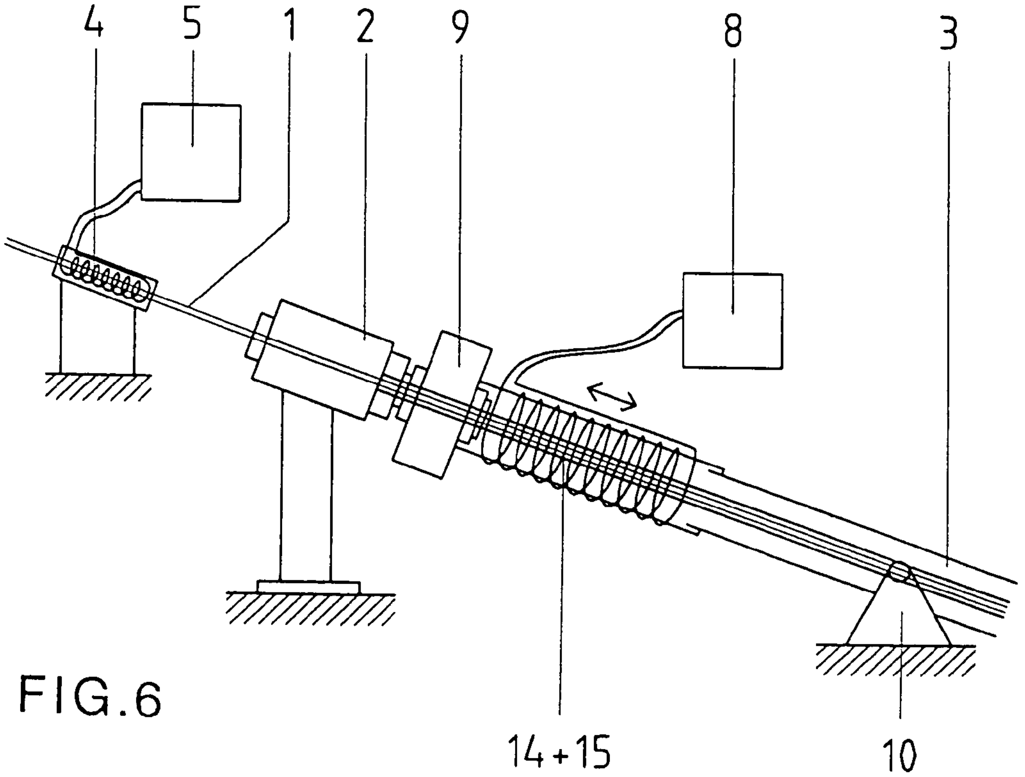
FIG. 6 illustrates the head of a system with telescoping tube that can slide onto the fixed tube and an induction apparatus arranged exteriorly on the telescoping tube, in the operating mode.
Figure 7:
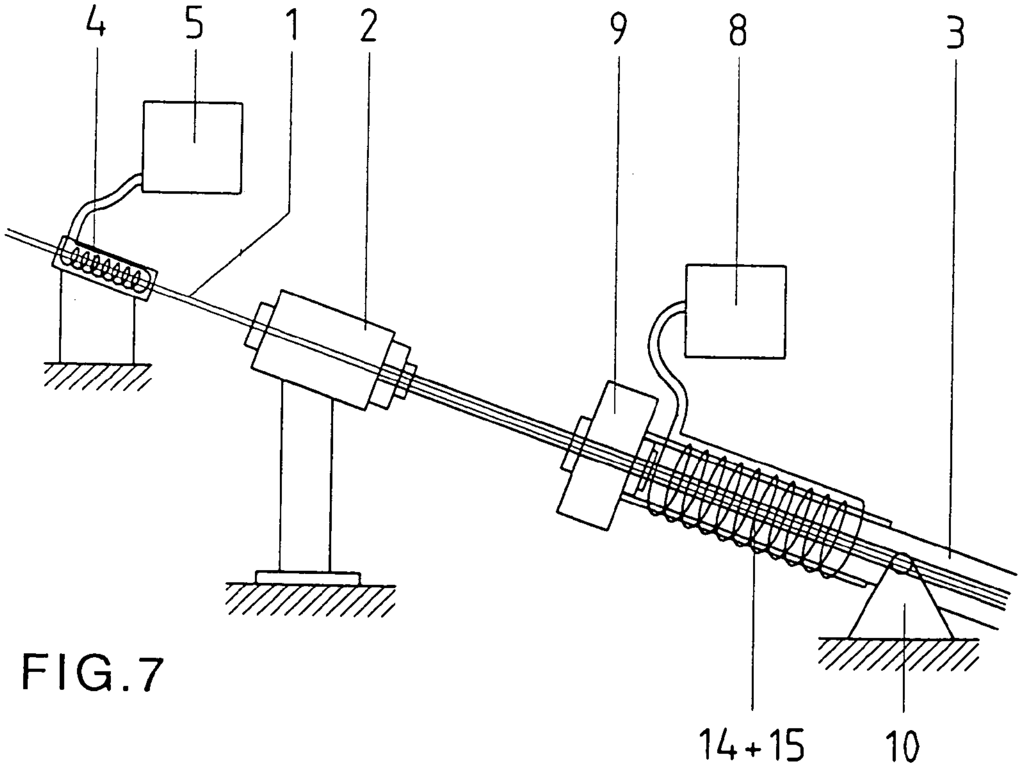
FIG. 7 illustrates the head of the system in FIG. 4, in the maintenance mode.

The system for producing cables has a supply drum 11 from which the cable core 1 is unwound, then is forwarded via a cable feed unit 12 and various other processing apparatus, and after passing an upstream induction heating apparatus 4 for preheating the cable core, is forwarded to a cross head 2, in which extruders (not illustrated) extrude insulating and semi-conductor material that is molded in the cross head 2 into a jacket for the cable core 1. The cable molded in the cross head 2 in this manner must now be subjected to vulcanization of its insulating and semi-conductor layers that were applied in the cross head 2. This vulcanization occurs in the vulcanization tube 3, 6, 7 that adjoins the cross head 2 and that is filled with a hot gaseous or vaporous medium. The part of the vulcanization tube immediately adjacent to the cross head is the displaceable tube part 6, which is insertable into the non-displaceable tube part 3 of the telescoping tube 3, 6 (FIGS. 2–5) or can slide onto the non-displaceable tube part 3 of the telescoping tube 3, 6 (FIGS. 6, 7). The gaseous or vaporous medium in the vulcanization tube carries the heat into the extrudate surrounding the cable core 1 from the exterior. However, vulcanization is substantially accelerated in that the cable core 1 is also heated by induction such that heat from the cable core 1 situated interiorly in the cable is introduced outwardly into the extrudate surrounding the cable core 1. Thus heat travels from the interior and from the exterior into the extrudate so that the temperature in the cross-section of the insulating and semi-conductor layers equalizes rapidly and rises above the vulcanization temperature and is maintained at this temperature. This induction heat is introduced into the cable core using two induction heating apparatus. The one induction heating apparatus 4, which is fed by the generator 5, is upstream of the cross head 2 and heats the cable core 1, even prior to jacketing, to a temperature just below the vulcanization temperature; the other induction heating apparatus 7, fed by the generator 8, is downstream of the cross head 2 and heats the cable core 1 to a temperature greater than the vulcanization temperature, so that heat from the cable core 2 migrates to the extrudate 6. The downstream induction heating apparatus 7 is situated in the displaceable tube piece 6 of the telescoping tube 3, 6.

Figure 2:
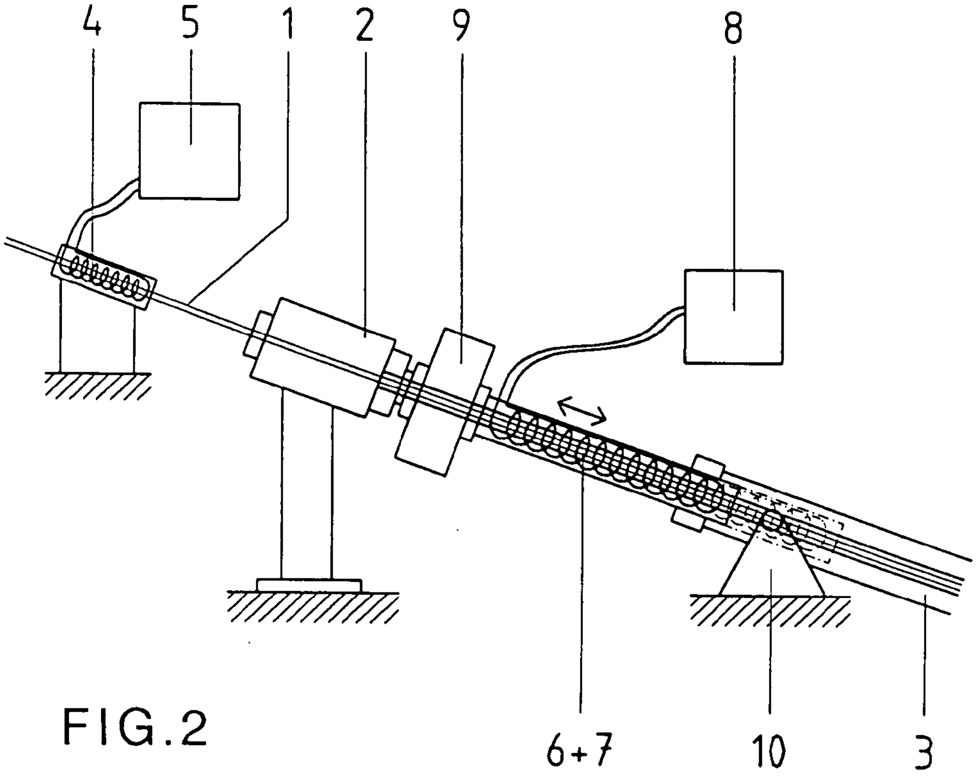
FIG. 2 illustrates the head of a system with telescoping tube that is insertable into the fixed tube and an induction apparatus arranged in the interior of the telescoping tube, in the operating mode.
Figure 3:
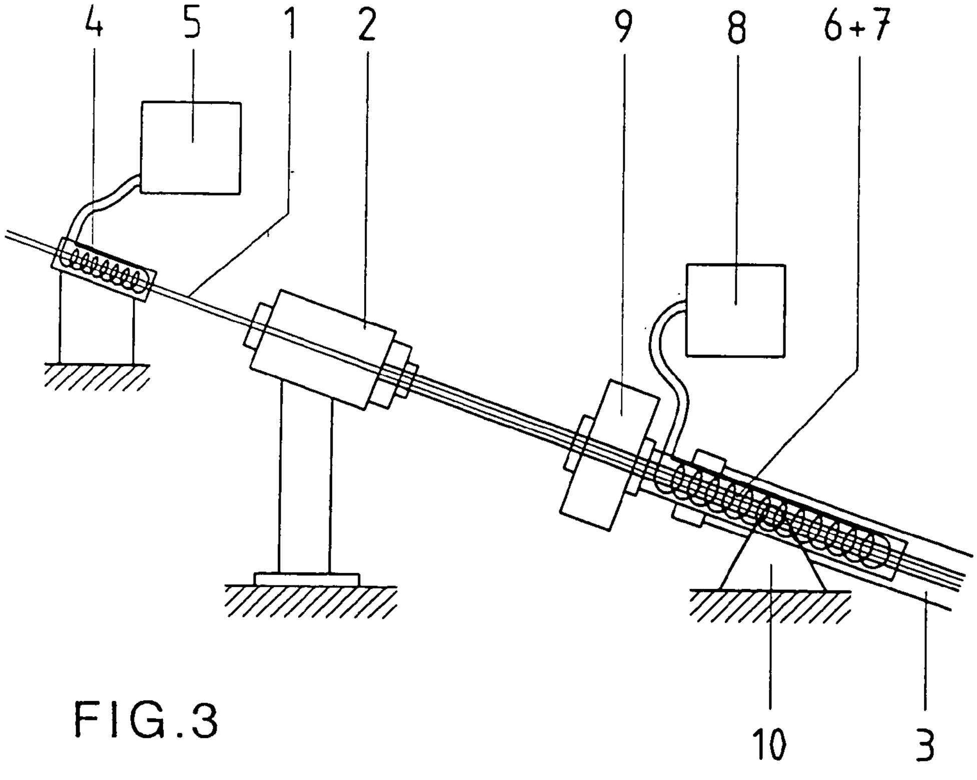
FIG. 3 illustrates the head of the system in FIG. 2, in the maintenance mode.

In the embodiment in FIGS. 2 and 3, the displaceable telescoping tube piece 6 is insertable into the immobile telescoping tube piece 3 while maintenance tasks are being performed on the cross head 2. In this case the induction heating apparatus 7 is installed in the interior of the movable telescoping tube piece 6.

A control apparatus 9 is upstream of the displaceable telescoping tube piece 6 and can be displaced together with the displaceable telescoping tube piece 6. This control apparatus 9 checks the position of the cable core 1 in the jacketing extrudate.

Figure 4:
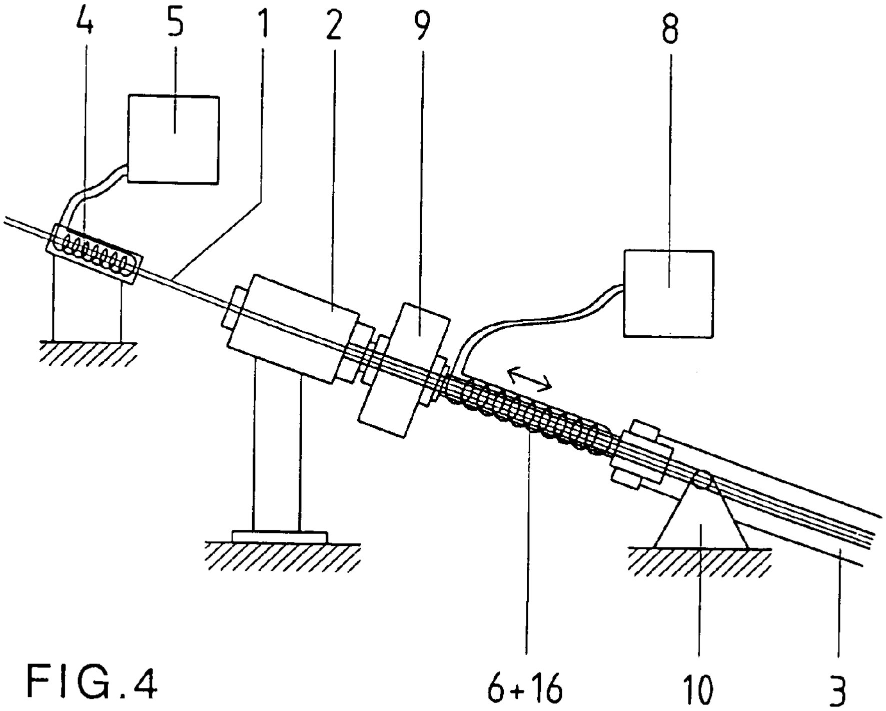
FIG. 4 illustrates the head of a system with telescoping tube that is insertable into the fixed tube and an induction apparatus arranged exteriorly on the telescoping tube, in the operating mode.
Figure 5:
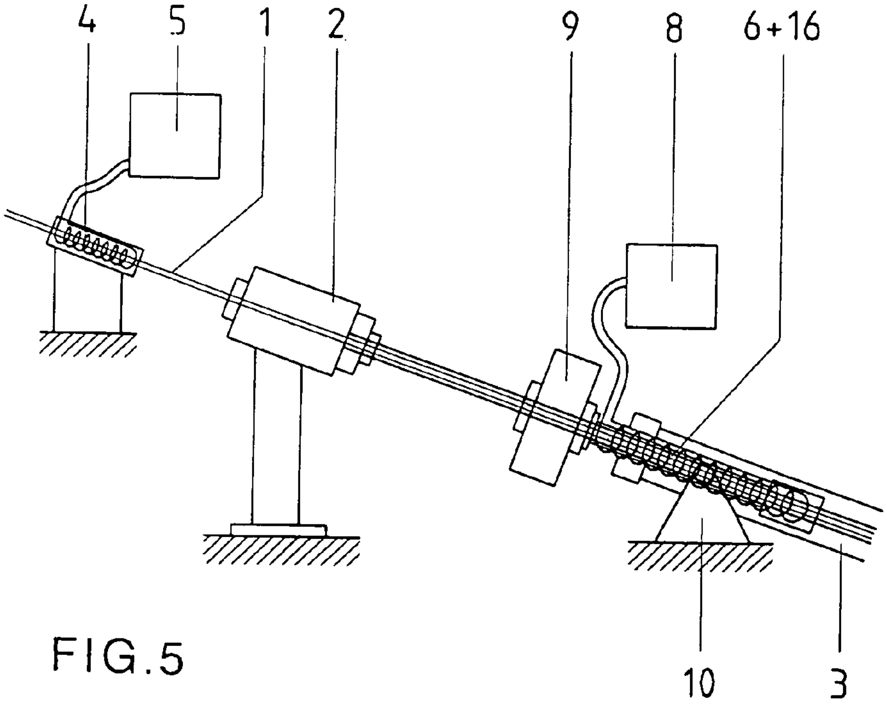
FIG. 5 illustrates the head of the system in FIG. 4, in the maintenance mode.

In the embodiment in FIGS. 4 and 5 the induction heating apparatus 16 is securely affixed exteriorly to the displaceable telescoping tube piece 6 and the telescoping tube piece 6/induction heating apparatus 16 unit is insertable into the non-displaceable telescoping tube piece 3. The displaceable telescoping tube piece 6 in this embodiment is made of a non-conducting material such as carbon fibers, ceramic, plastic, or the like.

In the embodiment in FIGS. 6 and 7, the induction heating apparatus 16 is securely affixed exteriorly to the displaceable telescoping tube piece 15 and the telescoping tube piece 15/induction heating apparatus 16 unit can slide over the non-displaceable telescoping tube piece 3. The displaceable telescoping tube piece 15 in this embodiment is also made of a non-conducting material such as carbon fibers, ceramic, plastic, or the like.

Figure 1:
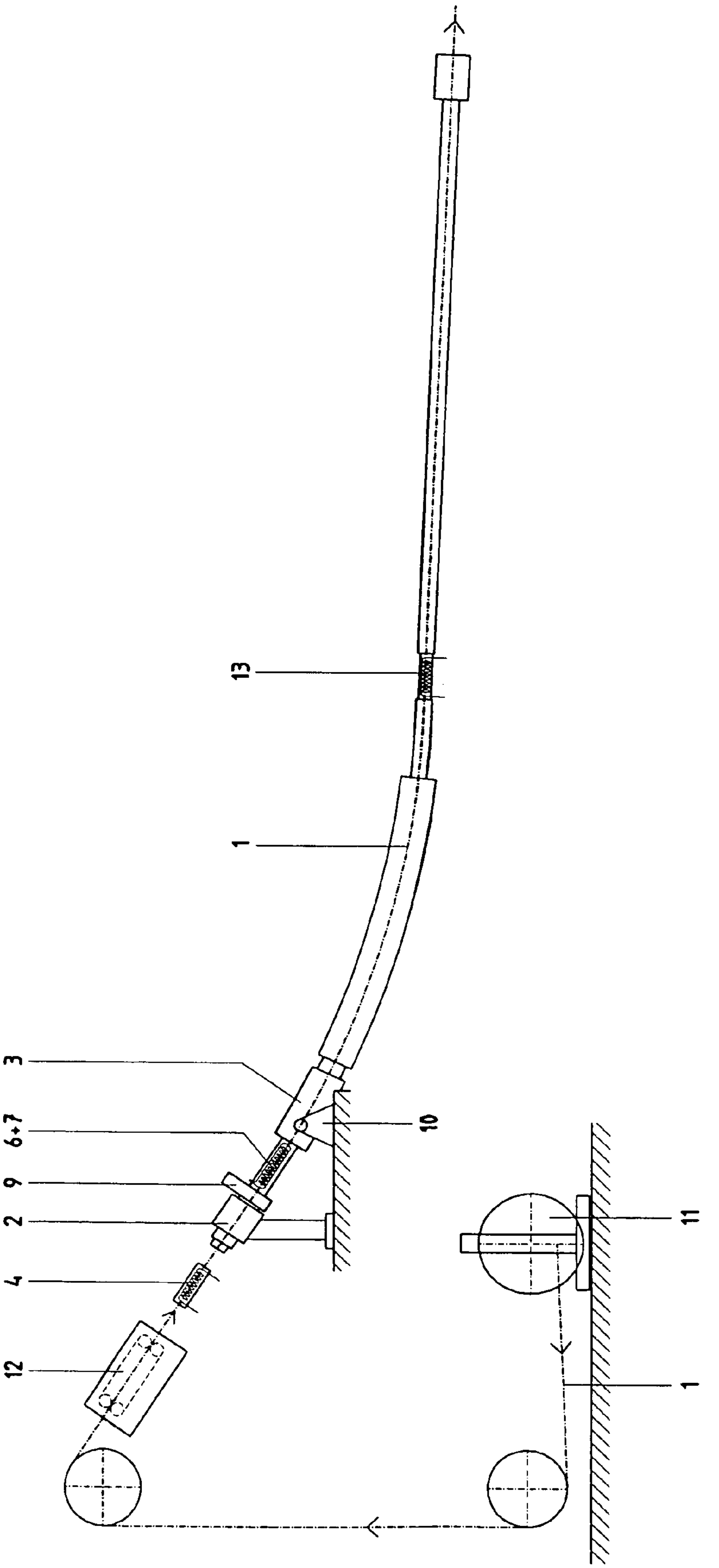
FIG. 1 illustrates the overall system.

The vulcanization tube 3, which in practice is very long and which is illustrated in FIG. 1 and of which only the front-most part is shown in the drawings in the subsequent figures, must be borne. The bearing 10 does this; it supports the immobile part 3 of the telescoping tube 3, 6. By installing the induction heating system 7 in the movable part 6 of the telescoping tube 3, 6, the bearing 10 can be positioned much closer to the cross head 2 than was possible in the prior art.

Also installed in this vulcanization tube 3, which in practice is very long, is another induction heating system 13 that maintains the vulcanization temperature and can even raise the temperature. This induction heating apparatus 13 can be installed at any site in the long fixed tube at which re-heating of the cable core is necessary or advantageous. Thus it can be installed at a site where the extruded cable jacket is already cooled from the exterior. Then heat migration from the cable core situated in the interior of the cable outward is obtained. This heat migration can be important for complete cross-linking or vulcanization of the cable jacket, and for more rapid cross-linking or vulcanization of the cable jacket and thus also for reducing the length of the entire system.

While the drawings merely illustrate examples of a cross-linking or vulcanization tube that runs largely in the manner of a horizontal catenary curve, the invention can also be applied for vertically standing cross-linking or vulcanization tubes.

LEGENDS

1 Cable core
2 Cross head
3 Fixed part of telescoping tube
4 Upstream induction heating apparatus
5 Generator
6 Displaceable part of telescoping tube
7 Downstream induction heating system installed in the displaceable telescoping tube
8 Generator
9 Control apparatus
10 Bearing
11 Supply drum
12 Cable feed unit
13 Induction heating apparatus
14 Movable telescoping tube piece that can slide over the fixed tube
15 Induction heating apparatus, built on the movable telescoping tube piece that can slide [over the fixed tube]
16 Induction heating apparatus, built on the movable insertable telescoping tube piece

The invention claimed is:

1. A system for producing cables, comprising:

an extrusion structure including at least one extruder and a cross head, the extrusion structure extruding a jacket layer around at least one line of cable;

a tube structure including a plurality of tubes disposed downstream of said cross head, said tube structure cross-linking and/or vulcanizing the extruded jacket layer;

said tubes including a movable tube and an immobile tube, said movable tube being slidable over said immobile tube;

said movable tube being stream wise adjacent to said cross head and enabling access to said cross head;

an induction heating system being securely disposed in or attached to said movable tube so that said induction heating system is insertable into or slidable over said immobile tube; and said movable tube including an exterior surface on which said induction heating system is affixed, said movable tube having an interior diameter that is greater than an exterior diameter of said immobile tube.

2. The system of claim 1, wherein said immobile tube extends substantially horizontally and forms a catenary curve.

3. The system of claim 1, wherein said induction heating system extends over the length of said movable tube.

4. The system of claim 1, wherein said movable tube comprises an electrically non-conducting material that is heat-resistant and resistant to compression.

5. The system of claim 1, wherein said movable tube comprises a carbon fiber compound.

6. The system of claim 1, wherein a portion of said immobile tube includes an electrically non-conducting material that is heat-resistant, resistant to compression and is surrounded by a second induction heating system.

7. The system of claim 1, wherein:

said induction heating system secured to said movable tube comprise a downstream induction heating system set for heating at a temperature above the vulcanization temperature; and further comprising an upstream induction heating system, disposed upstream of said cross head which, is set to a temperature below the vulcanization temperature.

8. The system of claim 1, wherein said immobile tube piece comprises a bearing with which an upper part of said immobile tube is supported.

9. The system of claim 1, wherein:

said movable tube is slidable over said immobile tube;

a bearing supports an upper part of said tube structure; and said bearing is connected to said immobile tube and is disposed at a location that is not covered by said movable tube when said movable tube is moved over said immobile tube.

10. A system for producing cables, comprising:

an extrusion structure including at least one extruder and a cross head, the extrusion structure extruding a jacket layer around at least one line of cable;

a tube structure including a plurality of tubes disposed downstream of said cross head, said tube structure cross-linking and/or vulcanizing the extruded jacket layer;

said tubes including a movable tube and an immobile tube, said movable tube being slidable over said immobile tube;

said movable tube being stream wise adjacent to said cross head and enabling access to said cross head;

an induction heating system being securely disposed in or attached to said movable tube so that said induction beating system is insertable into or slidable over said immobile tube;

a bearing supporting an upper part of said tube structure; and said bearing being connected to said immobile tube and being disposed at a location that is not covered by said movable tube when said movable tube is moved over said immobile tube.

11. The system of claim 10, wherein said immobile tube extends substantially horizontally and forms a catenary curve.

12. The system of claim 10, wherein said induction heating system extends over the length of said movable tube.

13. The system of claim 10, wherein said movable tube comprises an electrically non-conducting material that is heat-resistant and resistant to compression.

14. The system of claim 10, wherein said movable tube comprises a carbon fiber compound.

15. The system of claim 10, wherein said movable tube and said induction heating apparatus have an exterior diameter that is smaller than an interior diameter of said immobile tube.

16. The system of claim 10, wherein said movable tube includes an exterior surface on which said induction heating system is affixed, said movable tube having an interior diameter that is greater than an exterior diameter of said immobile tube.

17. The system of claim 10, wherein a portion of said immobile tube includes an electrically non-conducting material that is heat-resistant, resistant to compression and is surrounded by a second induction heating system.

18. The system of claim 10, wherein:

said induction heating system secured to said movable tube comprise a downstream induction heating system set for heating at a temperature above the vulcanization temperature; and further comprising an upstream induction heating system, disposed upstream of said cross head which, is set to a temperature below the vulcanization temperature.

* * * * *